United States Patent Office 3,428,578
Patented Feb. 18, 1969

3,428,578
FLAME RESISTANT POLYURETHANE PLASTICS
Rudolf Merten, Leverkusen, Otto Bayer, Burscheid, Gunther Braun, Cologne, and Hermann Kaiser, Leverkusen, Germany, assignors to Farbenfabriken Bayer Aktiengesellschaft, Leverkusen, Germany, a German corporation
No Drawing. Filed Mar. 3, 1965, Ser. No. 436,949
Claims priority, application Germany Mar. 4, 1964, F 42,194
U.S. Cl. 260—2.5                              5 Claims
Int. Cl. C08g 22/44; C09k 3/28

ABSTRACT OF THE DISCLOSURE

Flame-resistant polyurethane plastics which are based on phosphorous-containing polyols prepared from the reaction of a phosphorous acid with an alkylene oxide, an aldehyde and an aliphatic amine. The phosphorous polyols are reacted with organic polyisocyanates, if desired in the presence of a blowing agent, in order to prepare flame-resistant polyurethane plastics which have improved chemical properties including low brittleness, good adhesion, good pore structure and low tendency to shrink.

---

This invention relates to polyurethane plastics and more particularly to flame-resistant polyurethane plastics which are preferably polyurethane foams.

Various foam plastics which contain urethane groups and have different physical properties have been produced for a long time on a technical scale by the isocyanate polyaddition process from compounds having several active hydrogen atoms, especially compounds carrying hydroxyl and/or carboxyl groups, and polyisocyanates with the possible addition of water, blowing agents, activators, emulsifiers and other additives (Ang. Chemie A. 59, 1948, page 257; Handbook, "Bayer Kunststoffe," 3rd edition, 1963, pages 37 et seq.). With suitable choice of the components, both elastic and rigid foam plastics and any variations intermediate between these groups can be produced by this process.

Foam plastics based on polyisocyanate are advantageously produced by mixing the liquid components, either by adding all the starting materials for the reaction together or by first preparing a preadduct containing—NCO groups from a polyhydroxyl compound with an excess of polyisocyanate and then converting the preadduct into the foam plastic with water in a second stage of the process. Generally, it is desirable to impart a flame-resistant finish to the foam plastics. Many different additives, mainly based on phosphorous or halogen, have already been proposed for this purpose.

The use of dihydroxyalkyl phosphites, e.g. via an alkoxylation of the phosphorous acid or ester interchange processes, has already been proposed but these additives render the foaming process more difficult. Further, the method has already been used of converting dihydroxyalkyl phosphites into trihydroxyalkyl phosphites in the presence of alkaline catalysts but the presence of the alkaline catalyst interferes with the foaming process unless the catalyst is removed in an additional operation.

The use of adducts of phosphorous acid dialkyl esters and alpha, beta-unsaturated esters has also already been proposed but this addition requires the use of (alkaline) catalysts which must subsequently be removed. Moreover, this addition reaction, which is accompanied by an increase in viscosity which is disadvantageous for the foaming operation, involves an additional process stage.

Further, the use of Mannich compounds of primary and secondary alkanolamines, aldehydes and dialkyl phosphites has been described but this requires previous formation of corresponding esters of phosphorous acid and in no case permits immediate use of the phosphorous acid which is obtained, for example, as by-product in the manufacture of acid chloride, and which is often aqueous.

It is, therefore, an object of this invention to provide flame-resistant polyurethane plastics which are an improvement over those heretofore known particularly with regard to the disadvantages set forth above. Another object of this invention is to provide an improved process for the incorporation of flame-resistant properties in polyurethane plastics and particularly in cellular polyurethane plastics. Still a further object of this invention is to provide improved cellular polyurethane plastics and improved preparation thereof particularly in the mixing stage. Another object of this invention is to provide for the preparation of flame-resistant cellular polyurethane plastics which are prepared in the least possible number of steps and with the least possible purification procedures. Still a further object of this invention is to provide cellular polyurethane plastics which have high mechanical properties, low brittleness, good adhesion, good pore structure and low tendency towards shrinkage in addition to their flame-resistant properties.

The foregoing objects and others which will become apparent from the following description are accomplished, generally speaking, by providing flame-resistant foam plastics containing urethane groups, based on organic polyisocyanates, phosphorous-containing polyhydroxyl compounds and preferably a blowing agent, in which the polyhydroxyl compounds used are reaction products of phosphorous acid, which may be aqueous, alkylene oxides, aldehydes and aliphatic primary or secondary amines.

By means of the phosphorous-containing polyhydroxyl compounds used according to the invention, the phosphorous acid which is obtained practically as waste product and may be present in the aqueous form becomes utilizable in the foaming operation in one step by first reacting it with alkylene oxides, aldehydes and aliphatic amines. In this process, phenomena of incompatibility does not occur even with aqueous phosphorous acid solutions since the water is partly converted into compatible glycols by the preceding reaction with alkylene oxide; further, the starting materials of the process have excellent compatibility with other foam-forming components and can be foamed without any difficulty.

The phosphorous acid may be used either pure or in commercial form, e.g. as aqueous solution or as a phosphorous acid with an amount of pyrophosphoric acid. Owing to its low melting point, 60 to 90% aqueous solutions are preferably employed and mixtures which contain pyrophosphorous acid are generally converted into phosphorous acid or its aqueous solutions by the addition of water. Moreover, commercial phosphorous acid may be used which may contain minor quantities of hydrohalic acids from the production process as well as free carboxylic acids.

Examples of alkylene oxides which may be used are ethylene oxide, propylene oxide, butylene oxide, epichlorohydrin and styrene oxide.

Suitable amines are those having one or more aliphatically bound primary or secondary amino groups. Examples are: methylamine, ethylamine, butylamine, cyclohexylamine, ethylene diamine, hexamethylene diamine, dimethylamine, diethylamine, dibutylamine, dicyclohexylamine, ethylene diamine, hexamethylene dimethyl-ethanolamine, N - ethyl-ethanolamine, N - cyclohexylethanolamine, 1,2- or 1,3-propanolamine.

Examples of aldehydes that may be used are formaldehyde, acetaldehyde, propionaldehyde, butyraldehyde, benzaldehyde and in particular formaldehyde in the form of an aqueous solution or as paraformaldehyde.

A polyhydroxyl compound which has been found to be especially suitable for the process of the invention is a reaction product obtained from 70 to 90% aqueous phosphorous acid, cyclohexylamine, formalin and propylene oxide.

The proportions are preferably so chosen that 0.5 to 2.0 mols especially about 1 mol of aldehyde is used per mol of phosphorous acid. The quantities of amine are preferably so adjusted that for 1 mol of phosphorous acid, at least 0.5 and better 0.5 to 2.0 mols, especially 1 mol, of basic amino group is employed. The quantities of alkylene oxide are generally so chosen that per mol of phosphorous acid and per mol of water at least two mols of alkylene oxide are used while the amino component may be left out of account in calculating the quantity of alkylene oxide to be used. On the other hand, the finished polyhydroxyl compounds should preferably have a phosphorous content above 2.0% by weight and an hydroxyl content between 2.0 and 20.0% by weight especially between 5 and 17% by weight.

The preparation of the phosphorous-containing polyhydroxyl compounds as starting materials for the process of the invention may be carried out by various methods. For example, phosphorous acid diesters which contain hydroxyl groups may first be prepared either in an exothermic reaction by adding alkylene oxide dropwise into phosphorous acid at elevated temperature, e.g., between about 30 and 100° C. or by simultaneously adding phosphorous acid and alkylene oxide dropwise to inert solvents or to a polyhydroxyl compound placed in a reaction vessel (alcohols, alkoxylated phosphorous acid), and the phosphorous acid diester may then be condensed with aldehyde and amine. Another method consists in adding alkylene oxide at elevated temperature, e.g., between 50 and 150° C., the reaction products of phosphorous acid, amine and aldehyde, the use of excess amine leading to the simultaneous formation of oxalkylated amines.

The reaction may be carried out in the presence of inert solvents such as esters, ethers, aliphatic compounds, aromatic compounds or halogen hydrocarbons such as dimethyl sebacate, the diethyl ether of diethylene glycol, hexane, heptane, octane, benzene, toluene, o-dichlorobenzene and the like. The water formed on condensation may be removed in vacuo or, on the other hand, conversion of any residual saponified ester groups and any water still present may be effected by subsequent alkoxylation. The phosphorous-containing polyhydroxyl compounds thus obtained are low viscosity, usually colorless liquids which serve as starting materials for the process of the invention.

The phosphorous-containing polyhydroxyl compounds are reacted with polyisocyanates, blowing agents and additives to form foam plastics. In this process, they may be mixed with other known polyhydroxyl compounds such as polyesters, polyethers, polythioethers, polyacetals, (simple) adducts of alkylene oxides to amines, polyphosphites, alkoxylated phosphoric acids or any other suitable organic compound containing at least two active hydrogen containing groups as determined by the Zerewitinoff method.

Any suitable hydroxyl polyester may be used such as, for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutacomic acid, alpha-hydromuconic acid, beta-hydromuconic acid, alpha-butyl-alpha-ethyl-glutaric acid, alpha, beta-diethyl succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetra- carboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexane triol, triethanol amine, pentaerythritol, sorbitol and the like.

Any suitable polyhydric polyalkylene ether may be used such as, for example, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrin such as, for example, epichlorohydrin and the like as well as aralkylene oxide such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol, and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pages 257 to 262, published by Interscience Publishers, Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Suitable polyisocyanates are aliphatic and aromatic polyvalent isocyanates, e.g. alkylene diisocyanates such as tetra- and hexamethylene diisocyanate, arylene diisocyanate and its alkylation products such as phenylene diisocyanates, naphthylene diisocyanates, diphenylmethane diisocyanates, such as 4,4'-diphenylmethane diisocyanate, toluylene diisocyanates such as 2,4- and 2,6-toluylene diisocyanate, di- and triisopropylbenzene diisocyanates and triphenylmethane triisocyanates, p-isocyanatophenyl-thiophosphoric acid triester, p - isocyanato - phenyl-phosphoric acid triester, aralkyl diisocyanates such as 1-(isocyanatophenyl)-ethyl isocyanate or xylylene diisocyanates as well as polyisocyanates which may be substituted by many different substituents such as OR, $NO_2$, Cl; polyisocyanates modified with less than equivalent quantities of polyhydroxyl compounds such as trimethylolpropane, 1,2,6-hexane triol, glycerol, 1,4-butane diol, and the like may also be used. Further to be mentioned as examples are polyisocyanates masked with phenols or bisulphite, acetal modified isocyanates, polyisocyanates which contains biuret groups and polymerized isocyanates which have isocyanurate rings. It is also satisfactory and often desirable to use isocyanates which are unrefined and contain some of the by-products produced in their manufacture. Suitable isocyanates of this type are crude toluylene diisocyanates such as are obtained by the phosgenation of a mixture of toluylene diamines or crude diphenylmethane isocyanates such as those obtained by the phosgenation of crude diphenylmethane diamine.

The quantities of polyisocyanate used should generally be at least equivalent to the sum of reactive hydrogen atoms present. Where water is used as the blowing agent, a suitable excess of isocyanate corresponding to the water content will be used. On the other hand, further excess quantities of isocyanate groups may be incorporated in the foam structure by polymerization or secondary addition reactions. Instead of or in addition to foaming with polyisocyanate/water combinations, other blowing agents such as azo compounds, low boiling hydrocarbons, halogenated methanes or ethanes or vinylidene chloride may be used, such as trichlorofluoromethane, dichlorodifluoromethane, trichlorofluoroethane, methylene chloride, butane, hexane and the like.

Foaming is suitably carried out in the presence of catalysts, e.g. amines such as triethylamine, dimethylbenzylamine, 1-dimethylamino-3-ethoxypropane, triethylene diamine or metal salts such as tin (II)-acylates, dialkyl-tin-(IV)-acylates, acetylacetonates of heavy metals, molybdenum glycollate such as dibutyl tin di- hexoate, stannous octoate, stannous oleate and the like as well as other organo metallic compounds such as are disclosed in U.S. Patent 2,846,408. Further additives are emulsifiers, e.g. hydroxyethylated phenols or biphenylols, higher sulphonic acids, sulphuric acid esters of castor oil or ricinoleic acid, ammonium salts of oleic acid, foam stabilizers such as copolymers of alkylene oxide and siloxane. It is preferred to employ a silicone oil as disclosed in U.S. Patent 2,834,748 within the scope of the formula

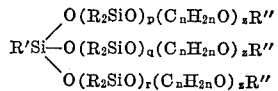

wherein R, R' and R'' are alkyl radicals having 1 to 4 carbon atoms; $p$, $q$, and $r$ each have a value of from 4 to 8 and $(C_nH_{2n}O)_z$ is a mixed polyoxyethylene oxypropylene group containing from 15 to 19 oxyethylene units and from 11 to 15 oxypropylene units and $z$ equal to from about 26 to about 34. Most preferred is a compound having the formula

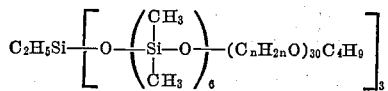

wherein $(C_nH_{2n}O)$ is a mixed polyoxyethylene and oxypropylene block copolymer containing about 7 oxyethylene units and about 13 oxypropylene units. Basic silicone oils or paraffins and further, dyestuffs, pigments, flame protective agents are further additives.

The preparation of the foam plastics is carried out in known manner by mechanical or manual mixing of the components and leads to excellent foam plastics of high mechanical qualities, low brittleness, good adhesion, perfect pore structure and low tendency to shrinkage. Moreover, the systems have good compatibility with each other and with halogenated methane- and ethane derivatives which are often used as blowing agents. Further, they have a good flames-protective effect.

The polyurethane foams of the invention are useful in many areas where such foams have been used before including insulation for both sound and thermal purposes in the production of wall panels and the like.

The invention is further illustrated by the following examples in which parts are by weight unless otherwise specified.

Preparation of the starting materials

A1–A14 (Table)

A suitable quantity of alkylene oxide is added dropwise at about 60 to 70° C. into the phosphorous acid of given concentration and the amine and aldehyde components are then added at about 20° C. The reaction mixture is heated to about 80° C. for about one hour and then concentrated in vacuo. The product may then be treated with more alkylene oxide at about 80° C.

A15

About 100 parts of about 82% phosphorous acid and about 85 parts of about 40% aqueous formaldehyde solution are simultaneously added dropwise under nitrogen into about 300 parts of cyclohexylamine in about 150 parts of water of about 75° C.; about 300 parts of propylene oxide are then added dropwise at about 75° C. and the mixture concentrated by evaporation at about 80° C. and about 12 mm. Hg. A further about 97 parts of propylene oxide are then added at about 70° C. and the product filtered off from solid constituents. About 650 parts of a highly viscous adduct is obtained with a phenylisocyanate consumption of 155.3 g./100 g., phosphorous content about 2.6%.

A16

(a) By the addition of about 1342 parts of propylene oxide to about 500 parts of about 82% phosphorous acid, about 1808 parts of propoxylated phosphorous acid are obtained having about 18.8% OH and a viscosity of about 299 cp./25° C.

(b) About 35 parts of paraformaldehyde are added portionwise at about 90° C. into about 100 parts of cyclohexylamine and about 0.5 part of concentrated hydrochloric acid and thereafter, about 360 parts of the propoxylated phosphorous acid obtained according to (a) are added dropwise. The reaction mixture is maintained at about 90° C. for about three hours and then for about 2 hours at about 90° C. and about 12 mm. Hg. About 478 parts of condensate having about 14.2% OH, a phosphorous content of 6.6% and a viscosity of about 5800 cp./25° C. are obtained.

A17

About 210 parts of diethanolamine followed by about 200 parts of about 40% aqueous formaldehyde solution are added dropwise at about 80° C. into about 720 parts of the propylated phosphorous acid obtained according to A16(a). The reaction mixture is maintained at about 80° C. for about 3 hours and then concentrated by evaporation at about 80° C. and about 12 mm. Hg. A residue remains behind which consists of about 954 parts of a pale colored adduct having about 21.4% OH, a phosphorous content of about 5.9% and a viscosity of about 3570 cp./25° C.

A18

About 7 parts of water and then about 180 parts of propylene oxide are added dropwise at about 60 to about 70° C. into about 75 parts of a mixture of phosphorous acid and its pyroformic compound (41.6% phosphorous). About 73 parts of butylamine and about 90 parts of 40% aqueous formaldehyde solution are then added dropwise at about 20° C. and the reaction mixture heated for about one hour at about 80° C. and concentrated by evaporation at about 80° C. and about 12 mm. Hg. About 60 parts of propylene oxide are then added at about 80° C. About 397 parts of adduct having about 8.4% OH, a viscosity of about 1907 cp./25° C. and a phosphorous content of about 7.9% are obtained.

TABLE

| No. | H₃PO₃ | Alkylene Oxide | Amine | Aldehyde | 2d parts of alkylene oxide | Yield | Viscosity, cp./25° C. | Consumption, C₆H₅NCO/100 g. | Phosphorous Content, percent |
|---|---|---|---|---|---|---|---|---|---|
| A1 | 234 | 70% 464 ᵃ | 100 cyclohexyl amine | 170 ᵇ | | 808 | 3,430 | 184 | 7.6 |
| A2 | 82 | 100% 174 ᵃ | 50 cyclohexyl amine | 90 ᵇ | | 322 | 42,600 | 115 | 9.5 |
| A3 | 234 | 70% 350 ᵃ | 200 cyclohexyl amine | 190 ᵇ | 62 propylene oxide | 838 | 15,420 | 128 | 7.5 |
| A4 | 164 | 100% 350 ᵃ | 150 cyclohexyl amine | 200 ᵇ | | 695 | 120,000 | 120.7 | 9.0 |
| A5 | 234 | 70% 465 ᵃ | 100 cyclohexyl amine | 190 ᵇ | | 773 | 18,800 | 96.5 | 8.15 |
| A6 | 200 | 82% 350 ᵃ | do | 190 ᵇ | | 712 | 2,860 | 142.6 | 8.55 |
| A7 | 200 | 82% 465 ᵃ | do | 190 ᵇ | | 797 | 8,900 | 126.0 | 7.3 |
| A8 | 200 | 82% 350 ᵃ | do | 190 ᵇ | 240 propylene oxide | 871 | 2,100 | 97.9 | 6.9 |
| | | | | | | | | | Percent OH |
| A9 | 100 | 82% 240 ᵃ | do | 90 ᵇ | 120 styrene oxide | 587 | 13,250 | | 11.9 5.2 |
| A10 | 100 | 82% 300 ᵃ | 100 methylamine (25%) | 80 ᵇ | | 446 | 2,240 | | 15.6 7.15 |
| A11 | 100 | 82% 300 ᵃ | 129 dibutylamine | 90 ᵇ | | 560 | 432 | | 12.6 5.6 |
| A12 | 100 | 82% 300 ᵃ | 53 hexamethylene-diamine | 90 ᵇ | | 478 | 9,000 | | 14.7 6.7 |
| A13 | 100 | 82% 300 ᵃ | 99 cyclohexyl amine | 106 benzaldehyde | | 600 | 4,760 | | 11.8 5.3 |
| A14 | 100 | 82% 290 1-butene oxide | 95 cyclohexyl amine | 90 ᵇ | 721 butene oxide | 587 | 2,340 | | 11.9 5.4 |

ᵃ Propylene oxide.  ᵇ 40% aqueous formaldehyde solution.

Example 1

About 30 parts of A1 are thoroughly stirred with about 70 parts of oxypropylated trimethylolpropane (hydroxyl number 380), about 3 parts permethylated aminoethyl-piperazine, about 0.3 part of polysiloxane polyalkylene glycol ester having the formula

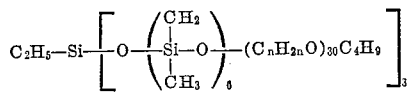

wherein $(C_nH_{2n}O)$ is a mixed polyoxyethylene and oxypropylene block copolymer containing about 17 oxyethylene units and about 13 oxypropylene units, and about 6 parts of sodium castor oil sulphate (50% water).

After the addition of about 173 parts of 4,4'-diphenylmethane diisocyanate (90%) obtained by phosgenating the reaction product of aniline with formaldehyde which contains about 90% 4,4'-diphenylmethane diamine, a finely porous, flame-resistant hard foam plastic having the following physical properties is obtained.

| | | |
|---|---|---|
| Weight per unit volume | kg./m.³ | 34 |
| Resistance to compression | kp./cm.² | 2.2 |
| Impact strength | cm. kp./cm.² | 0.2 |
| Resistance to bending under heat | °C | 147 |
| Water uptake | vol. percent | 2.8 |

Example 2

About 30 parts of A2 are thoroughly mixed with about 50 parts of oxypropylated trimethylolpropane, hydroxyl-number 380), about 20 parts of oxypropylated ethylene diamine, hydroxyl number 450), about 2 parts of ethyl morpholine, about 0.3 part of polysiloxane polyalkylene glycol ester of Example 1 and about 6 parts of sodium castor oil sulphate (50% water).

After stirring about 153 parts of 4,4'-diphenylmethane diisocyanate of Example 1 (90%) into the mixture, a difficulty inflammable foam plastic having the following physical properties is obtained:

| | | |
|---|---|---|
| Weight per unit volume | kg./m.³ | 48 |
| Resistance to compression | kp./cm.² | 3.8 |
| Impact strength | cm. kp./cm.² | 0.4 |
| Resistance to bending under heat | °C | 139 |
| Water uptake | mol. percent | 3.2 |

Example 3

About 50 parts of A3 are thoroughly stirred with about 50 parts of a polyester of adipic acid, phthalic acid anhydride, oleic acid and trimethylolpropane (hydroxy number 380), about 0.3 part of polysiloxane polyalkylene glycol ester of Example 1 and about 6 parts of sodium castor oil sulphate (50% water).

After the addition of about 134 parts of 4,4'-diphenylmethane diisocyanate (90%) of Example 1, a flame-resistant hard foam plastic having the following physical properties is obtained:

| | | |
|---|---|---|
| Weight per unit volume | kg./m.³ | 32 |
| Resistance to compression | kp./cm.² | 1.3 |
| Impact strength | cm. kp./cm.² | 0.2 |
| Resistance to bending under heat | °C | 114 |
| Water uptake | vol. percent | 3.6 |

Example 4

About 30 parts of A4 are thoroughly mixed with about 70 parts of propoxylated trimethylolpropane (hydroxy number 380), about 3 parts of tetramethylene diamine, about 0.5 part of polysiloxane polyalkylene glycol ester of Example 1 and about 2 parts of sodium castor oil sulphate (50% water).

After the addition of a soluton of about 30 parts of trichlorofluoromethane in about 106 parts of 4,4'-diphenylmethane diisocyanate (90%) of Example 1, a difficultly inflammable foam plastic having the following physical properties is obtained:

| | | |
|---|---|---|
| Weight per unit volume | kg./m.³ | 23 |
| Resistance to compression | kp./cm.² | 1.2 |
| Impact strength | cm. kp./cm.² | 0.4 |
| Resistance to bending under heat | °C | 107 |
| Water uptake | vol. percent | 2.0 |

Example 5

About 30 parts of A5 are thoroughly stirred with about 70 parts of a polyester of adipic acid, phthalic acid anhydride, oleic acid and trimethylolpropane (hydroxy number 380) about 3 parts of dimethylbenzylamine, about 0.3 parts of polysiloxane polyalkylene glycol ester of Example 1 and about 6 parts of sodium castor oil sulphate (50% water).

After stirring about 131 parts of 4,4'-diphenylmethane diisocyanate (90%) of Example 1 into the mixture, a difficultly inflammable hard foam plastic having the following physical properties is obtained.

| | | |
|---|---|---|
| Water per unit volume | kg./m.³ | 33 |
| Resistance to compression | kp./cm.² | 1.9 |
| Impact strength | cm. kp./cm.² | 0.4 |
| Resistance to bending under heat | °C | 138 |
| Water uptake | vol. percent | 3.7 |

Example 6

About 20 parts of A6 are mixed thoroughly with about 80 parts of a polyester of adipic acid, phthalic acid anhydride, oleic acid and trimethylolpropane (hydroxy number 380), about 3 parts of ethyl morpholine, about 0.3 part of polysiloxane polyalkylene glycol ester of Example 1 and about 6 parts of sodium castor oil sulphate (50% water).

After the addition of about 150 parts of 4,4'-diphenylmethane diisocyanate (90% of Example 1, a difficultly

9 inflammable hard foam plastic having the following physical properties is obtained:

Weight per unit volume _____ kg./m.$^3$__ 03
Resistance to compression _____ kp./cm.$^2$__ 1.8
Impact strength _____ cm. kp./cm.$^2$__ 0.3
Resistance to bending under heat _____° C__ 132
Water uptake _____vol. percent__ 3.7

Example 7

About 20 parts of A7 are stirred thoroughly with about 50 parts of a polyester of adipic acid, phthalic acid anhydride, oleic acid and trimethylolpropane (hydroxyl number 380), about 30 parts of oxypropylated ethylene diamine (hydroxy number 450), about 2 parts of dimethyl benzylamine, about 0.3 part of polysiloxane polyalkylene glycol ester in Example 1 and about 2 parts of sodium castor oil sulphate (50% water).

After the addition of a solution of about 30 parts of trichlorofluoromethane in about 121 parts of 4,4'-diphenylmethane diisocyanate (90%) of Example 1 a flame resistant hard foam plastic having the following physical properties is obtained:

Weight per unit volume _____ kg./m.$^3$__ 27
Resistance to compression _____ kp./cm.$^2$__ 1.7
Impact strength _____ cm. kp./cm.$^2$__ 0.2
Resistance to bending under heat _____° C__ 131
Water uptake _____vol. percent__ 2.7

Example 8

About 30 parts of A8 are mixed thoroughly with about 40 parts of a polyester of adipic acid, phthalic acid anhydride, oleic acid and trimethylolpropane (hydroxyl number 380), about 30 parts of propoxylated ethylene diamine (hydroxyl number 450), about 0.5 part of polysiloxane polyalkylene glycol ester of Example 1 and about 2 parts of sodium castor oil sulphate (50% water).

After the addition of a solution of about 30 parts of trichlorofluoromethane in about 122 parts of 4,4'-diphenylmethane diisocyanate (90%) of Example 1 a difficultly inflammable hard foam plastic having the following mechanical properties is obtained:

Weight per unit volume _____ kg./m.$^3$__ 27
Resistance to compression _____ kp./cm.$^2$__ 1.9
Impact strength _____ cm. kp./cm.$^2$__ 0.3
Resistance to bending under heat _____° C__ 146
Water uptake _____vol. percent__ 3.4

Example 9

About 30 parts of A9 are stirred thoroughly with about 40 parts of a polyester of adipic acid, phthalic acid anhydride, oleic acid and trimethylolpropane (hydroxyl number 380), about 30 parts of oxypropylated ethylene diamine (hydroxyl number 450), about 0.3 part of polysiloxane polyalkylene glycol ester of Example 1 and about 6 parts of sodium castor oil sulphate (50% water).

After the addition of about 150 parts of 4,4'-diphenylmethane diisocyanate (90%) of Example 1, a flame-resistant foam plastic having the following mechanical properties is obtained:

Weight per unit volume _____ kg./m.$^3$__ 46
Resistance to compression _____ kp./cm.$^2$__ 2.4
Impact strength _____ cm. kp./cm.$^2$__ 0.4
Resistance to bending under heat _____° C__ 121
Water uptake _____vol. percent__ 2.6

Example 10

About 30 parts of A10 are mixed thoroughly with about 40 parts of oxypropylated trimethylolpropane (hydroxyl number 380), about 30 parts of ethylene diamine (hydroxyl number 450), about 2 parts of permethylated aminoethyl piperazine, about 0.5 part of polysiloxane polyalkylene glycol ester of Example 1 and about 2 parts of sodium castor oil sulphate (50% water).

After the addition of a solution of about 30 parts of trichlorofluoromethane in about 122 parts of 4,4'-diphenylmethane diisocyanate (90%) of Example 1 a finely porous hard foam plastic having good flame protection and the following physical properties is obtained:

Weight per unit volume _____ kg./m.$^3$__ 22
Resistance to compression _____ kp./cm.$^2$__ 1.4
Impact strength _____ cm. kp./cm.$^2$__ 0.3
Resistance to bending under heat _____° C__ 128
Water uptake _____vol. percent__ 4.4

Example 11

About 30 parts of A11 are stirred thoroughly with about 40 parts of a polyester of adipic acid, phthalic acid anhydride, oleic acid and trimethylolpropane (hydroxyl number 380), about 30 parts of oxypropylated ethylene diamine (hydroxyl number 450), about 0.5 part of polysiloxane polyalkylene glycol ester of Example 1 and about 2 parts of sodium castor oil sulphate (50% water).

After the addition of a solution of about 30 parts of trichlorofluoromethane in about 114 parts of 4,4'-diphenylmethane diisocyanate (90%) of Example 1, a difficulty inflammable foam plastic having the following physical properties is obtained:

Weight per unit volume _____ kg./m.$^3$__ 25
Resistance to compression _____ kp./cm.$^2$__ 1.6
Impact strength _____ cm. kp./cm.$^2$__ 0.2
Resistance to bending under heat _____° C__ 137
Water uptake _____vol. percent__ 2.4

Example 12

About 30 parts of A12 are mixed thoroughly with about 40 parts of oxypropylated trimethylolpropane (hydroxyl number 380) about 30 parts of oxypropylated ethylene diamine (hydroxyl number 450), about 3 parts of methylolpropane, about 0.5 part of polysiloxane polyalkylene glycol ester of Example 1 and about 2 parts of sodium castor oil sulphate (50% water).

After the addition of about 30 parts of trichlorofluoromethane in about 119 parts of 4,4'-diphenylmethane diisocyanate (90%) of Example 1 a difficulty inflammable hard foam plastic having the following mechanical properties is obtained:

Weight per unit volume _____ kg./m.$^3$__ 24
Resistance to compression _____ kp./cm.$^2$__ 1.3
Impact strength _____ cm. kp./cm.$^2$__ 0.2
Resistance to bending under heat _____° C__ 128
Water uptake _____vol. percent__ 1.3

Example 13

About 30 parts of A13 are stirred thoroughly with about 40 parts of oxypropylated trimethylolpropane (hydroxyl number 380), about 30 parts of oxypropylated ethylene diamine (hydroxyl number 450), about 0.3 part of polysiloxane polyalkylene glycol ester of Example 1 and about 6 parts of sodium castor oil sulphate (50% water).

After the addition of about 143 parts of 4,4'-diphenylmethane diisocyanate (90%) of Example 1, a finely porous, difficulty inflammable foam plastic having the following physical properties is obtained:

Weight per unit volume _____ kg./m.$^3$__ 33
Resistance to compression _____ kp./cm.$^2$__ 2.4
Impact strength _____ cm. kp./cm.$^2$__ 0.4
Resistance ot bending under heat _____° C__ 129
Water uptake _____vol. percent__ 2.4

Example 14

About 30 parts of A14 are mixed thoroughly with about 40 parts of a polyester of adipic acid, phthalic acid anhydride, oleic acid and trimethylolpropane (hydroxyl number 380), about 30 parts of oxypropylated ethylene diamine (hydroxyl number 450), about 0.5 part of polysiloxane polyalkylene glycol ester of Example 1 and about 2 parts of sodium castor oil sulphate (50% water).

After stirring a solution of about 30 parts of trichlorofluoromethane in about 113 parts of 4,4'-diphenylmethane diisocyanate (90%) of Example 1 into the reaction mixture, a finely porous, difficulty inflammable hard foam plastic having the following mechanical properties is obtained:

| | |
|---|---|
| Weight per unit volume _____kg./m.³__ | 30 |
| Resistance to compression _____kp./cm.²__ | 2.3 |
| Impact strength _____ cm. kp./cm.²__ | 0.3 |
| Resistance to bending under heat _____° C__ | 141 |
| Water uptake _____vol. percent__ | 2.3 |

Example 15

About 50 parts of A15 are stirred thoroughly with about 20 parts of oxypropylated trimethylolpropane (hydroxyl number 380), about 30 parts of oxypropylated ethylene diamine (hydroxyl number 450) 0.3 part of polysiloxane polyalkylene glycol ester of Example 1 and about 6 parts of sodium castor oil sulphate (50% water).

After mixing about 153 parts of 4,4'-diphenylmethane diisocyanate (90%) of Example 1 into the reaction mixture, a flame-resistant hard foam plastic having the following physical properties is obtained:

| | |
|---|---|
| Weight per unit volume _____kg./m.³__ | 31 |
| Resistance to compression _____kp./cm.²__ | 1.8 |
| Impact strength _____ cm. kp./cm.²__ | 0.2 |
| Resistance to bending under heat _____° C__ | 131 |
| Water uptake _____vol. percent__ | 3.7 |

Example 16

About 50 parts of A16 are mixed thoroughly with about 50 parts of oxypropylated trimethylolpropane (hydroxyl number 380), aobut 3 parts of permethylated aminoethyl piperazine, about 0.3 part of polysiloxane polyalkylene glycol ester of Example 1 and about 6 parts of sodium castor oil sulphate (50% water).

After the addition of about 164 parts of 4,4'-diphenylmethane diisocyanate (90%) of Example 1 a difficulty inflammable hard foam plastic having the following mechanical properties is obtained:

| | |
|---|---|
| Weight per unit volume _____kg./m.³__ | 25 |
| Resistance to compression _____kp./cm.²__ | 1.4 |
| Impact strength _____ cm. kp./cm.²__ | 0.2 |
| Resistance to bending under heat _____° C__ | 147 |
| Water uptake _____vol. percent__ | 3.5 |

Example 17

About 30 parts of A17 are stirred thoroughly with about 40 parts of oxypropylated trimethylolpropane (hydroxyl number 380), about 30 parts of oxypropylated ethylene diamine (hydroxyl number 450), about 0.5 part of polysiloxane polyalkylene glycol ester of Example 1 and about 2 parts of sodium castor oil sulphate (50% water).

After the addition of about 135 parts of 4,4'-diphenylmethane diisocyanate (90%) of Example 1 a flame resistant foam plastic having the following mechanical properties is obtained:

| | |
|---|---|
| Weight per unit volume _____kg./m.³__ | 25 |
| Resistance to compression _____kp./cm.²__ | 1.4 |
| Impact strength _____cm. kp./cm.²__ | 0.1 |
| Resistance to bending under heat _____° C__ | 129 |
| Water uptake _____vol. percent__ | 3.8 |

Example 18

About 30 parts of A18 are mixed intensively with about 40 parts of oxypropylated trimethylolpropane (hydroxyl number 380), about 30 parts of oxypropylated ethylene diamine (hydroxy number 450), about 2 parts of sodium castor oil sulphate (50% water).

After stirring into the reaction mixture a solution of about 30 parts of trichlorofluoromethane in about 105 parts of 4,4'-diphenylmethane diisocyanate (90%) of Example 1, a flame resistant hard foam plastic having the following physical properties is obtained:

| | |
|---|---|
| Weight per unit volume _____kg./m.³__ | 23 |
| Resistance to compression _____kp./cm.²__ | 1.6 |
| Impact strength _____cm. kp./cm.²__ | 0.4 |
| Resistance to bending under heat _____° C__ | 123 |
| Water uptake _____vol. percent__ | 3.1 |

It is to be understood that the foregoing working examples are given for the purpose of illustration and that any other suitable polyol, additive, isocyanate or the like could have been used provided that the teachings of this disclosure are followed.

Although the invention has been described in considerable detail for the purpose of illustration, it is to be understood that variations can be made by those skilled in the art without departing from the spirit of the invention and scope of the claims.

What is claimed is:

1. A polyurethane plastic prepared by a process which comprises reacting an organic polyisocyanate with a phosphorous containing polyhydroxyl compound having a phosphorus content of at least 2% by weight and an hydroxyl content of about 2 to about 20% by weight prepared by a process which comprises reacting a phosphorous acid with an alkylene oxide, an aldehyde and an aliphatic amine in such proportions that at least about 0.5 mol of formaldehyde at least about 0.5 mol of aliphatic primary or aliphatic secondary amines and at least 2 mols of alkylene oxide per mol of phosphorus acid is employed.

2. The polyurethane plastic of claim 1 wherein said aliphatic amine is selected from the group consisting of an aliphatic primary amine and an aliphatic secondary amine.

3. The polyurethane plastic of claim 1 wherein a blowing agent is included to prepare a cellular polyurethane plastic.

4. The polyurethane plastic of claim 5 wherein said phosphorous containing polyhydroxyl compound is prepared by reacting a 70 to 90% aqueous phosphorous acid, cyclohexyl amine, formaldehyde and propylene oxide.

5. A cellular polyurethane plastic prepared by a process which comprises reacting in the presence of a blowing agent an organic polyisocyanate with a polyhydroxyl compound prepared by reacting about 0.5 to about 2 mols of formaldehyde with about 0.5 to 2 mols of an aliphatic amine selected from the group consisting of aliphatic primary amines and aliphatic secondary amines and at least two mols of alkylene oxide per mol of phosphorous acid and per mol of water, with 1 mol of phosphorous acid so that a product having a phosphorous content of at least 2% by weight and an hydroxyl content of 2 to 20% by weight is obtained.

References Cited

UNITED STATES PATENTS

| 3,312,638 | 4/1967 | Bonin et al. _____ 260—2.5 |
| 3,134,755 | 5/1964 | Muller et al. _____ 260—2.5 XR |
| 3,094,434 | 6/1963 | Chadman et al. __ 260—77.5 XR |

DONALD E. CZAJA, Primary Examiner.

R. W. MULCAHY, Assistant Examiner.

U.S. Cl. X.R.

260—77.5, 924, 47.5